UNITED STATES PATENT OFFICE.

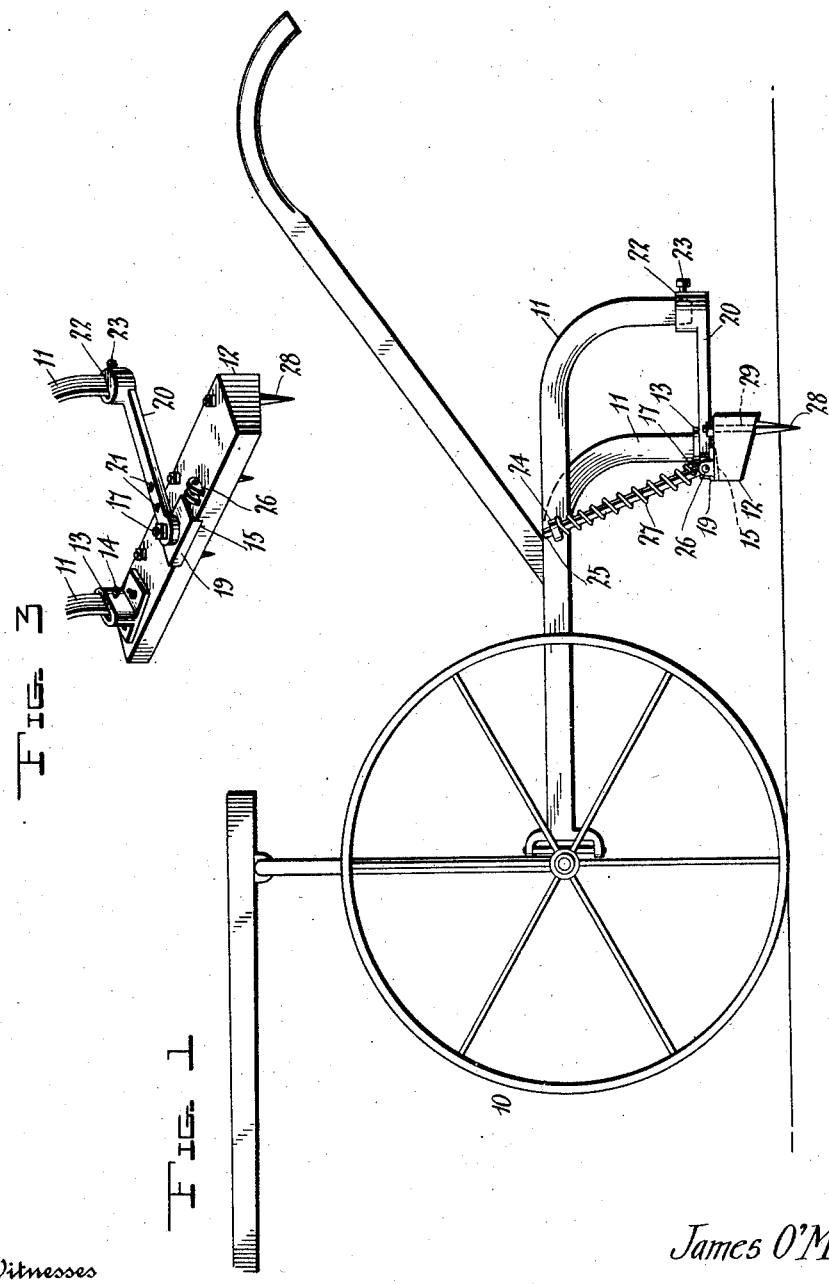

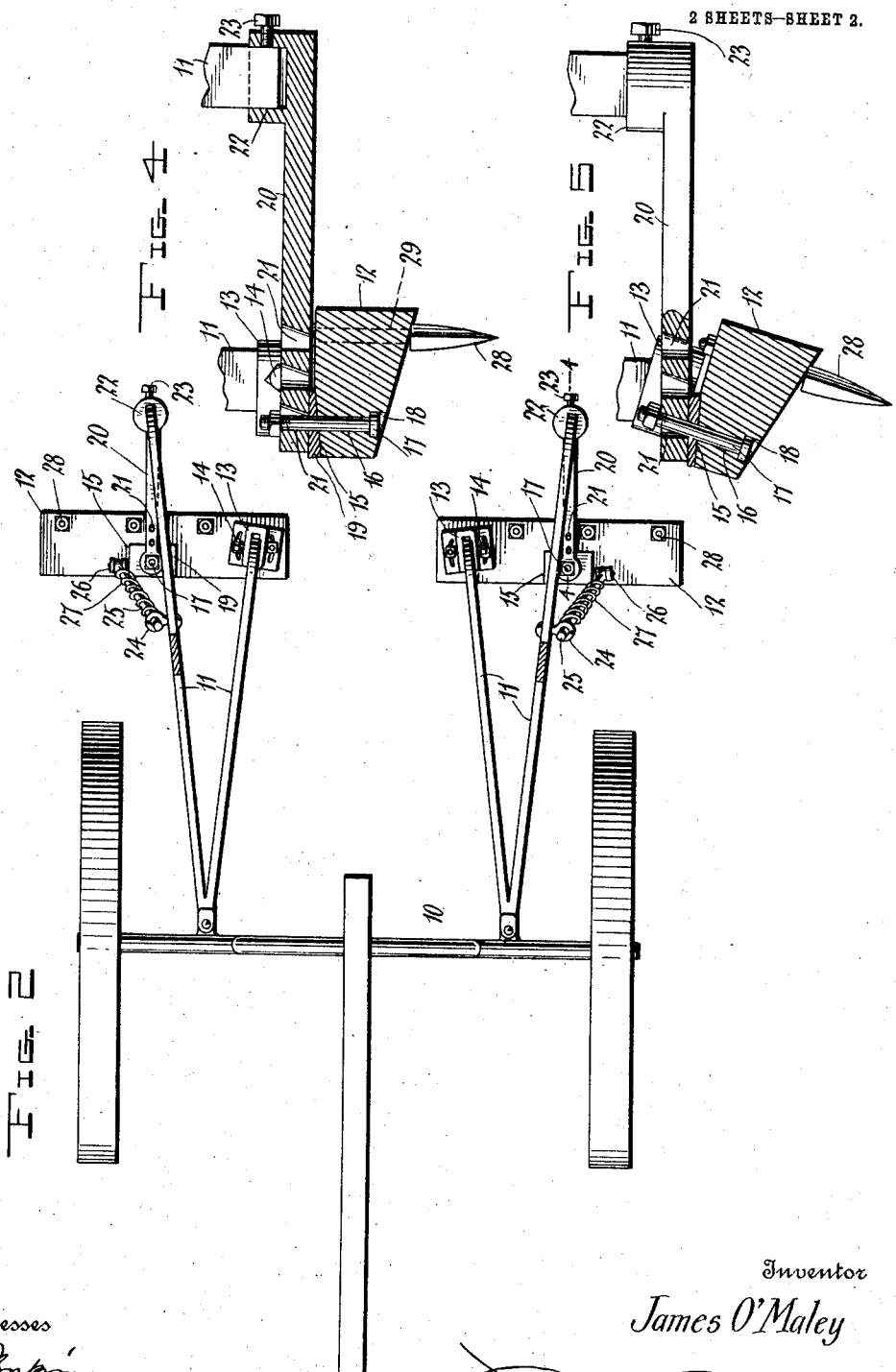

JAMES O'MALEY, OF NEAR LOOGOOTEE, INDIANA.

CULTIVATOR ATTACHMENT.

970,743. Specification of Letters Patent. Patented Sept. 20, 1910.

Application filed March 28, 1910. Serial No. 551,856.

*To all whom it may concern:*

Be it known that I, JAMES O'MALEY, a citizen of the United States, residing near Loogootee, in the county of Daviess, State of Indiana, have invented certain new and useful Improvements in Cultivator Attachments; and I do hereby declare the following to be a full, clear, and exact description of the invention, such as will enable others skilled in the art to which it appertains to make and use the same.

This invention relates to cultivators and has special reference to an attachment for cultivators adapted to enable a cultivator to be utilized as a drag or harrow.

One object of the invention is to provide an attachment of this description which may be fitted to the standards of a cultivator, the arrangement being such that the drag beam is supported on two standards by novel attaching means which enable it to be set in different positions to meet the special requirements of the case.

With the above and other objects in view, the invention consists in general of a drag beam provided with certain novel attaching means to enable it to be secured to a pair of cultivator standards.

The invention further consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a side elevation of a cultivator equipped with this invention. Fig. 2 is a top plan view of the same. Fig. 3 is a perspective view of the attachment applied. Fig. 4 is a section on the line 4—4 of Fig. 2, the drag beam being shown in one position. Fig. 5 is a section similar to Fig. 4 but with the drag beam shown in a different position.

The numeral 10 indicates in general a cultivator of the ordinary type. This cultivator is provided with the usual standards 11 arranged, as is common, in pairs so that their lower ends are in staggered relation.

The invention proper comprises a drag beam 12 which, in cross section, is of trapezoidal form with the major base of the trapezoid toward the rear. At one end of this drag beam 12 is secured a socket 13 and through one of the sides of this socket extends a set screw 14. The socket 13 is of oblong shape to receive the lower end of one of the standards 11 and it is intended that said socket shall receive the end of the foremost standard of a pair. The beam 12 is provided adjacent its center with a beveled rabbet 15 and an opening 16 extends through the beam 12 from this rabbet. In this opening 16 is held a pivot bolt 17, the head lying in a suitable recess 18 formed on the under side of the beam. In the rabbet 15 is held a beveled washer 19 through which the bolt passes.

At 20 is a bar one end of which is provided with a series of bolt receiving openings 21 and through one of these openings passes the bolt 17. The other or free end of the bar 20 is provided with a socket 22 having a set screw 23 and this socket 22 receives the lower end of the other standard of the pair to which the device is attached. By changing the position of the beveled washer 19 from that shown in Fig. 4 to that shown in Fig. 5 the beam 12 may be tilted as clearly shown in said figures.

In order to support the beam one of the standards 11 is provided with an eye 24 through which passes a rod 25 the lower end of which is pivotally secured to the beam 12 as at 26. Surrounding this rod and having its lower end attached thereto is a spring 27 the upper end of which bears against and is attached to the eye 24. By this means the beam and straight portion of the standard 11 are resiliently connected so that any unusual obstruction will permit necessary movement of the drag beam while at the same time it will be normally held in proper position for operation.

When the drag beam is used as a harrow a series of harrow teeth 28 are secured thereto, suitable openings 29 being provided for the reception of said teeth.

When it is desired to apply the device to a cultivator the ordinary cultivator shovels are removed and the ends of the standards 11 are fitted in their respective sockets. The bolt 17 is positioned in a suitable opening 21 to give the required angle of the beam to the line of draft and the washer placed in one or the other of the positions indicated in Figs. 4 or 5 according to the result desired to be obtained. The cultivator is then driven to the field in the ordinary manner.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In an attachment for cultivators, a drag beam, connecting means at one end of said beam adapted to engage a cultivator standard, a bar pivoted to the beam adjacent its other end, said bar being provided with means at its free end to engage a second cultivator standard, and a beveled washer held between said beam and bar at the pivot point.

2. In an attachment for cultivators, a drag beam, connecting means at one end of said beam adapted to engage a cultivator standard, a bar pivoted to said beam adjacent its other end, said bar being provided at its free end with attaching means adapted to engage the lower end of a second cultivator standard, and resilient means adapted to connect said beam to a second point on one of said standards.

3. In an attachment for cultivators, a drag beam, connecting means at one end of said beam adapted to engage a cultivator standard, a bolt projecting above said beam adjacent its center, a bar provided with a plurality of holes at one end adapted to receive said bolt to pivotally connect the bar and beam, securing means at the opposite end of said bar adapted to engage a second cultivator beam, and resilient means adapted to connect said beam to a second point on one of said standards.

4. In an attachment for cultivators, a drag beam, connecting means at one end of said beam adapted to engage a cultivator standard, a bar pivoted to the beam adjacent its other end, said bar being provided with means at its free end to engage a second cultivator standard, a beveled washer held between said beam and bar at the pivot point, and resilient means adapted to connect said beam to a second point on one of said standards.

5. In an attachment for cultivators, a drag beam, a socket at one end of said drag beam adapted to receive the lower end of a cultivator standard, a bar pivoted to said drag beam adjacent its middle, said bar being provided at its free end with a socket to receive the lower end of a second cultivator standard, set screws for said sockets to secure said standards within the sockets, and resilient means adapted to connect said beam to a second point on one of said standards.

In testimony whereof, I affix my signature, in presence of two witnesses.

JAMES O'MALEY.

Witnesses:
  EUGENE STRANGE,
  WILLIAM O'MALEY.